2,974,884
Patented Mar. 14, 1961

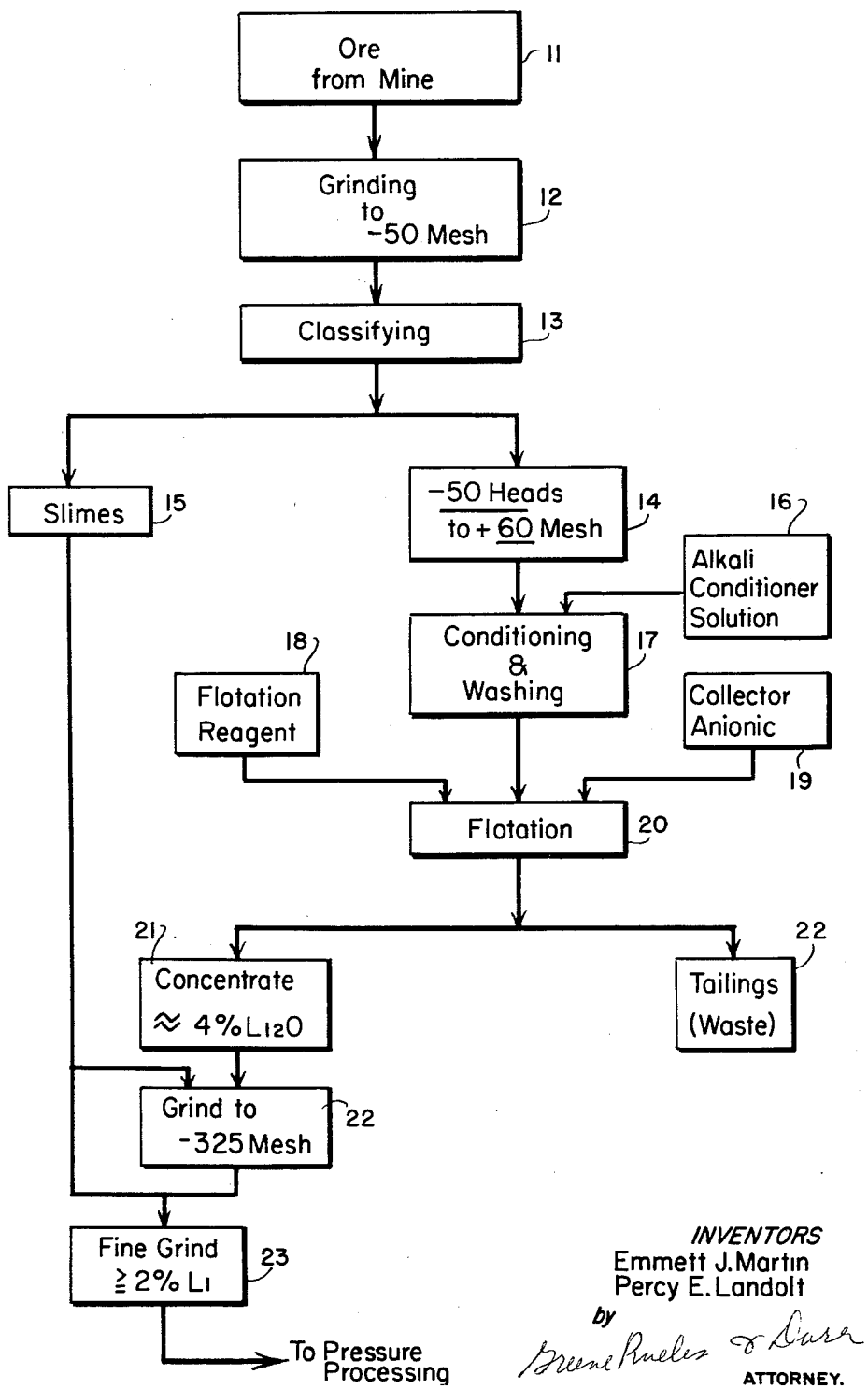

2,974,884
BENEFICIATION OF LITHIUM ORES

Emmett J. Martin, Lincolnton, N.C., and Percy E. Landolt, White Plains, N.Y., assignors to Basic Atomics Incorporated, New York, N.Y., a corporation of Delaware Filed Jan. 2, 1959, Ser. No. 784,640

1 Claim. (Cl. 241—20)

This invention relates to a process for the recovering of lithium from ores containing minerals consisting of lithia, silica and alumina. The invention is particularly related to a process of preparing finely ground ore materials for treatment by the process of U.S. application Serial No. 667,994, filed June 25, 1957, of George P. Robinson now forfeited in favor of U.S. application Serial No. 802,517, filed March 27, 1959.

In said application Serial No. 667,994 a process of recovering lithium from ores containing substantial amounts of alpha spodumene ore or a similar lithium-silica-alumina, mineral-containing ore which does not require the decrepitation of the alpha spodumene to beta spodumene is disclosed. This process requires that the mineral be finely ground to a size of 44 microns or less (—325 mesh), and treated in a closed container under a pressure of over 50 p.s.i.g. at temperatures of 250 to 400° C. with sulfuric acid. About 25 to 100% by weight, based on the weight of the ore, of sulfuric acid is required for the reaction. Since this process avoids the expensive decrepitation step which involves treating ore which is coarsely ground (relative to the fineness of grinding in this process) at temperatures of about 1000°–1400° C. for about ½ hour or longer, it represents a distinct advantage over existing processes of recovering lithium from spodumene, all of which employ the decrepitating step.

As a further development of the process, as set forth in application Serial No. 802,517, sufficient water may be included in the mix of ground ore and sulfuric acid to produce a slime and the incorporation of the water therein provides a readily transportable liquor which is advantageous from an engineering standpoint. With the addition of water to the mix the pressure at which the mix is treated during heating may reach as high as 2000 p.s.i.g. Certain advantages of increased fluidity, etc., may also be obtained by adding 0.3 to 4% by weight of sodium sulfate to the mix. In such a process the heat treatment at 250 to 400° C. is continued for at least two hours. For convenience these processes are referred to below and in the claims as the high-pressure sulfuric acid lithium recovery process.

The above described processes do not require any beneficiation of the ore materials. Ordinarily, two drawbacks to the beneficiation treatment are the additional cost of grinding preparatory to flotation, and the losses in finest ground material separated as slimes and ordinarily discarded. The slimes interfere with the flotation process and must be removed. In the ordinary processes fine slime forming particles would be lost in the atmosphere as flue losses during decrepitation in any event.

The invention is based on the discovery that with the above described process of recovering lithium, a beneficiation treatment of the ores may be carried out in which there is no substantial loss of lithium values and at a small additional expense.

Among the objects of the invention, therefore is to provide a finely ground concentrated spodumene ore especially adapted for recovery of lithium therefrom by the high pressure sulfuric acid recovery process which does not involve decrepitation of the ore.

The objects of the invention are obtained by finely grinding the ore material to a size of about 50 mesh to about 60 mesh, flotation treating the ground ore to provide a slime, a concentrate and a tails component. Blending and regrinding the concentrate and slime to a size of —325 mesh or less (or regrinding the concentrate and then blending with the slimes) to produce an ore mix for treatment by the high pressure sulfuric acid recovery process.

In this improved process, the cost of grinding is not an additional cost required by the beneficiation because the ore must be ground in any event to a fineness less than that required for the flotation treatment. This grinding is advantageously carried out in several stages so that there is no disadvantage in adding the flotation treatment between the grinding steps. The slimes which represent the largest loss in beneficiation treatments are not lost but rather can be added to the mix for treatment without requiring further grinding. Also, the fine grinding of the tails to final size is avoided.

In the flotation process the flotation agents may comprise, per ton of ore, about ½ to 5 pounds of a higher organic acid such as "Aliphate No. 44," for example, which is a higher fatty acid derived from tall oil, and about ½ to 3 pounds of a flotation compound such as MIBC, which is a methyl isobutyl carbonal flotation reagent. Advantageously, the ground ore is treated with an aqueous cleaning or conditioning solution, such as an aqueous solution of sodium hydroxide, soda ash, trisodium phosphate, sodium sulfide, etc., or mixture thereof. The conditioning treatment may precede or follow or be simultaneous with the desliming step. The conditioning treatment is conducted at about a 50% solids mix and consumes about 1–8 pounds of cleaning reagent per ton of ore.

The figure of the drawing is a flow diagram of a very satisfactory way of carrying out the process.

According to the example illustrated in said diagram the ore 11 from the mine is ground to an approximate mesh size of —50. In the grinding (depending on the mill employed) from 5–25% of the ore will be of a size of —60 whereas for the flotation process it is desired that the size be between about —50 mesh and +60 mesh. The ground ore is then separated, at 13 on the diagram as by a cyclone separator, into a fraction 14 of —50 to +60 mesh and a slime fraction 15 of —60 mesh. The fraction 14 which is to be concentrated by the beneficiation treatment is then mixed with the NaOH conditional solution 16 to form a 50% solids (by volume) mix and blunged, for example, to clean or condition the particles for flotation as shown in box 17. The treated mix is washed with water to remove the conditioning agent. The conditioning and washing may be carried out in the apparatus to be employed for the flotation or in a separate treating vessel.

A frother 18, such as an oil, and an anionic collector material 19 are then added to the mix and the latter is treated in the flotation device as shown in box 20 to recover the heads 21 of concentrated ore and the tailings 22 which may be discarded.

The heads 21 are then ground to —325 mesh in one or several stages as shown in box 22. At some suitable point in grinding step or steps 22 the slimes 15 are introduced or if the slimes are already of —325 mesh they may be added to the fine grind 23.

Thereafter, the fine grind ore is treated by the said high pressure sulfuric acid recovery process.

The following examples further illustrate the process of the invention.

Example 1

Ore from the mine containing 1.2% or 24 pounds of $Li_2O$ per ton was ground in a ball mill to obtain a mix of about −50 mesh. The mix was fed to a cyclone separator and separated whereupon particles of +50 were returned to the ball mill, 1600 pounds per ton of particles of −50 to +60 mesh were separated as heads 14 for flotation and 400 pounds per ton of particles of −60 mesh were separated as slimes 15. A chemical analysis showed that the 400 pounds of slimes 15 contained 1% of $Li_2O$ or about 4 pounds of $Li_2O$ (from each original ton of ore) whereas the −50 to +60 mesh particles contained about 1¼% of $Li_2O$ or 20 pounds $Li_2O$ per ton. The heads 14 were conditioned by mixing with an equal volume of an aqueous solution containing 1.6 pounds NaOH and then washed with water. The conditioned heads 17 were then flotation treated with 1.7 pounds per ton of Aliphate No. 44 as an anionic collector and 1.3 pounds/ton of MICB as a frother to produce the heads 21. Heads 21 comprise 600 pounds of ore at a lithia content of 2.8% or 16.8 pounds. The tails comprise 1000 pounds/ton of the original ore and contain less than 0.35% lithia and are discarded. The heads 21 are mixed with the slimes 15 and ground to −325 mesh. The combined heads 21 and slimes 15 represent approximately 86% of the lithia content of the original ore.

The resultant powder of −325 mesh is mixed with water to produce a 60% by weight of solids mixture. About 4% of sodium sulfate based on the weight of the concentrate is added. This mixture with about 46% by weight of sulfuric acid, is treated at a temperature of about 260° C. and at a pressure of about 850 p.s.i. for approximately four hours. The reaction mixture is discharged from the reaction vessel after the pressure in the latter is reduced somewhat and the lithium sulfate is leached therefrom and may be recovered by conventional processes.

Example 2

The process is conducted as in Example 1 except that the mixture is more carefully ground so that the slimes comprise only about 240 pounds/ton of ore of about 1% lithia and the heads 14 comprise 1760 pounds per ton of about 1¼% lithia. The flotation produces a concentrate 21 comprising 450 pounds per ton of ore containing about 4¼% (over 19 pounds) of lithia per ton. When the concentrate 21 and slimes 15 are mixed the mix comprises 690 pounds of concentrate containing about 3.13% or 21.6 pounds/ton of lithia which represents about 90% of the original lithia content. The lithium is recovered from the concentrate as in Example 1.

The features and principles underlying the invention described above in connection with specific exemplifications will suggest to those skilled in the art many other modifications thereof. It is accordingly desired that the appended claim shall not be limited to any specific feature or details thereof.

We claim:

The improved process of grinding lithium-aluminasilica type minerals to a fine particle size of less than 40 microns preparatory to treating the ore, without decrepitating the same, comprising interrupting the grinding operation when the bulk of the ore particles have a mesh size of about −50 to +60, sizing the resultant ore to provide a slime fraction and a head fraction of about −50 to +60 mesh size, flotation treating said head fraction to provide a concentration of lithium-containing mineral comprising about 450–600 lbs./ton of the original mineral, thereafter mixing and continuing the grinding of the concentrated lithium-containing fraction and the slimes until the particle size is no more than 40 microns and treating the ground mixture having a particle size of 40 microns or less with sulfuric acid at a temperature of 250–400° C. and at pressure of 50–2000 p.s.i. to change the lithium content thereof to lithium sulfate.

References Cited in the file of this patent

UNITED STATES PATENTS

| | | |
|---|---|---|
| 2,596,407 | Jackson | May 13, 1952 |
| 2,748,938 | Bunge | June 5, 1956 |
| 2,793,933 | Kroll | May 28, 1957 |

OTHER REFERENCES

Mellor: "A Comprehensive Treatise on Inorganic and Theoretical Chemistry," volume two, published by Longmans, Green and Company (London), 1922 (page 443).